United States Patent
Zhao et al.

(10) Patent No.: US 9,524,216 B2
(45) Date of Patent: Dec. 20, 2016

(54) METHOD, DEVICE AND MOBILE TERMINAL FOR INFORMATION BACKUP

(75) Inventors: Cuihua Zhao, Shenzhen (CN); Tao Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 192 days.

(21) Appl. No.: 14/382,601

(22) PCT Filed: May 14, 2012

(86) PCT No.: PCT/CN2012/075467
§ 371 (c)(1),
(2), (4) Date: Sep. 10, 2014

(87) PCT Pub. No.: WO2013/131320
PCT Pub. Date: Sep. 12, 2013

(65) Prior Publication Data
US 2015/0033049 A1    Jan. 29, 2015

(30) Foreign Application Priority Data
Mar. 9, 2012    (CN) .......................... 2012 1 0061815

(51) Int. Cl.
*G06F 11/14*    (2006.01)
*G06F 1/28*    (2006.01)
(Continued)

(52) U.S. Cl.
CPC ............. *G06F 11/1446* (2013.01); *G06F 1/28* (2013.01); *G06F 1/3212* (2013.01);
(Continued)

(58) Field of Classification Search
CPC ...... G06F 11/1446; G06F 1/28; G06F 1/3212; G06F 1/3234; G06F 2201/81; H04M 1/2745; H04M 1/274516; H04M 1/72536; H04W 52/0261; H04W 52/0277; Y02B 60/50

See application file for complete search history.

(56) References Cited

U.S. PATENT DOCUMENTS 6,427,072 B1    7/2002    Reichelt
8,055,306 B2    11/2011    Li
(Continued)

FOREIGN PATENT DOCUMENTS

CN    1869942 A    11/2006
CN    1972477 A    5/2007
(Continued)

OTHER PUBLICATIONS

Fitbit Corporation; Fitbit Tracker Product Manual 2009, https://www.fitbit.com/manual#section-start, p. 3.*
(Continued)

*Primary Examiner* — Thomas Lee
*Assistant Examiner* — Chad Erdman
(74) *Attorney, Agent, or Firm* — Oppedahl Patent Law Firm LLC

(57) ABSTRACT

Disclosed is a method for information backup, comprising: an information backup device detects a battery volume of a mobile terminal and determines whether or not the battery volume reaches a preset low-battery alarming threshold; and the information backup device stores contact information stored in the mobile terminal into a backup memory card when the battery volume reduces the low-battery alarming threshold. The present disclosure also discloses a device and a mobile terminal for information backup. The present disclosure enables the user of a mobile terminal to timely view contact information when the mobile terminal runs out of power.

12 Claims, 4 Drawing Sheets

(51) Int. Cl.
  *G06F 1/32* (2006.01)
  *H04M 1/2745* (2006.01)
  *H04M 1/725* (2006.01)
  *H04W 52/02* (2009.01)

(52) U.S. Cl.
  CPC ........ *G06F 1/3234* (2013.01); *H04M 1/2745* (2013.01); *H04M 1/72536* (2013.01); *H04W 52/0277* (2013.01); *G06F 2201/81* (2013.01); *H04M 1/274516* (2013.01); *H04W 52/0261* (2013.01); *Y02B 60/50* (2013.01)

(56) References Cited

U.S. PATENT DOCUMENTS

| | | |
|---|---|---|
| 2002/0077159 A1 | 6/2002 | Jiang |
| 2004/0132501 A1 | 7/2004 | Jiang |
| 2005/0164748 A1 | 7/2005 | Kitaji |
| 2009/0286578 A1* | 11/2009 | Nagasawa ......... H04W 52/0277 455/574 |
| 2010/0022224 A1 | 1/2010 | Li |
| 2011/0028118 A1 | 2/2011 | Thomas |
| 2011/0159931 A1* | 6/2011 | Boss ................. H04W 52/0264 455/574 |
| 2012/0284552 A1* | 11/2012 | Archer, Jr. ............ G06F 1/3203 713/324 |

FOREIGN PATENT DOCUMENTS

| | | | |
|---|---|---|---|
| CN | 100389541 C | 5/2008 | |
| CN | 101834944 A * | 9/2010 | .......... H04M 1/2745 |
| GB | 2461097 A | 12/2009 | |
| JP | H11353064 A | 12/1999 | |
| WO | 0039908 A1 | 7/2000 | |
| WO | 2011130977 A1 | 10/2011 | |

OTHER PUBLICATIONS

Supplementary European Search Report in European application No. 12870528.2, mailed on Mar. 27, 2015.
International Search Report in international application No. PCT/CN2012/075467, mailed on Nov. 15, 2012.
English Translation of the Written Opinion of the International Search Authority in international application No. PCT/CN2012/075467, mailed on Nov. 15, 2012.

* cited by examiner

METHOD, DEVICE AND MOBILE TERMINAL FOR INFORMATION BACKUP

TECHNICAL FIELD

The present disclosure relates to the field of communication, and more particularly to a method, a device and a mobile terminal for information backup.

BACKGROUND

With the development of mobile terminals, the functions of mobile terminals are getting more and more powerful while the cost of mobile terminals is getting lower and lower, resulting in that people rely more and more on mobile terminals and use mobile terminal more and more frequently. However, as most of mobile terminals are powered by a battery, the conflict between the battery capacity of a mobile terminal and the powerful functions of the mobile terminal becomes increasingly apparent as big-screened intelligent mobile terminals develop. In daily use, it often happens that the user of a mobile terminal cannot view the contact information stored in the FLASH (Flash Memory) of the mobile terminal because the mobile terminal runs out of power and cannot be immediately charged, which interrupts a communication process or even causes a worse loss to the user.

As stated above, there is a problem in the prior art that the user of a mobile terminal can not view contact information since the exhaustion of the power of the mobile terminal.

SUMMARY

The present disclosure provides a method, a device and a mobile terminal for information backup, to address the problem existing in the prior art that the user of a mobile terminal cannot view contact information due to the exhaustion of the power of the mobile terminal.

The present disclosure provides the following technical solutions:

on one hand, a method for information backup is provided, including:

an information backup device detects a battery volume of a mobile terminal and determining whether or not the battery volume reaches a preset low-battery alarming threshold; and the information backup device stores contact information stored in the mobile terminal into a backup memory card when the battery volume reduces to the low-battery alarming threshold.

Optionally, after the step that the information backup device stores contact information stored in the mobile terminal into a backup memory card, the method may further include:

the information backup device detects the battery volume of the mobile terminal and determines whether or not the battery volume reaches a preset emergency contact display threshold which is smaller than the low-battery alarming threshold;

the information backup device shuts down the mobile terminal when the battery volume reduces to the emergency contact display threshold; and the information backup device controls the mobile terminal to enter into an emergency contact display mode to display contact information on the screen of the mobile terminal after a launching instruction input by a user is received, wherein the mobile terminal consumes less power when in the emergency contact display mode than when running normally.

Optionally, before the step that an information backup device detects a battery volume of a mobile terminal and determines whether or not the battery volume reaches a preset low-battery alarming threshold, the method may further include:

the information backup device sets the low-battery alarming threshold and the emergency contact display threshold according to the input of the user.

Optionally, the step that the information backup device stores contact information stored in the mobile terminal into a backup memory card comprises:

the information backup device detects whether or not the backup memory card is normally inserted into the mobile terminal and stores the contact information stored in the mobile terminal into the backup memory card when the backup memory card is normally inserted into the mobile terminal and is in a loading state.

Optionally, the step that the information backup device shuts down the mobile terminal may further include:

the backup display device sets an emergency contact display flag bit to be 'true' and then shutting down the mobile terminal;

the step of that the information backup device controls the mobile terminal to enter into an emergency contact display mode to display contact information on the screen of the mobile terminal after a launching instruction input by a user is received may further include:

the backup display device receives the launching instruction input by the user, determines whether or not the emergency contact display flag bit is 'true', and controls the mobile terminal to enter into the emergency contact display mode to display the contact information stored in the mobile terminal on the screen of the mobile terminal when the emergency contact display flag bit is 'true';

after the step that the information backup device controls the mobile terminal to enter into an emergency contact display mode to display contact information on the screen of the mobile terminal after a launching instruction input by a user is received, the method further comprises: receiving, by the backup display device, a setting instruction input by the user and setting the value of the emergency contact display flag bit according to the setting instruction.

Optionally, after the step of controlling, by the information backup device, the mobile terminal to enter into an emergency contact display mode to display contact information on the screen of the mobile terminal after a launching instruction input by a user is received, the method further comprises:

the information backup device receives a page-up instruction input by the user and performing a page-up action on the displayed contact information according to the page-up instruction; or the information backup device receives a page-down instruction input by the user and performing a page-down action on the displayed contact information according to the page-down instruction.

Also provided is a device for information backup, including: a terminal battery volume detection module and a contact backup module, wherein the terminal battery volume detection module is configured to detect battery volume of a mobile terminal and determine whether or not the battery volume reaches a preset low-battery alarming threshold; and the contact backup module is configured to store contact information stored in the mobile terminal into a backup memory card when the battery volume reduces to the low-battery alarming threshold.

Optionally, the terminal battery volume detection module may also be configured to detect the battery volume of the mobile terminal and determine whether or not the battery volume reaches a preset emergency contact display threshold which is smaller than the low-battery alarming threshold; and the information backup device may further include:

an emergency contact display module configured to: shut down the mobile terminal when the battery volume reduces to the emergency contact display threshold; control the mobile terminal to enter into an emergency contact display mode to display contact information on the screen of the mobile terminal after a launching instruction input by the user is received, wherein the mobile terminal consumes less power when in the emergency contact display mode than when running normally.

Optionally, the information backup device also includes:

a power threshold presetting module configured to set the low-battery alarming threshold and the emergency contact display threshold according to the input of the user.

Optionally, the contact backup module is configured to detect whether or not the backup memory card is normally inserted into the mobile terminal when the battery volume reduces to the low-battery alarming threshold and store the contact information stored in the mobile terminal into the backup memory card when the backup memory card is normally inserted into the mobile terminal and is in a loading state.

Optionally, the emergency contact display module is configured to, when the battery volume reduces to the emergency contact display threshold, set an emergency contact display flag bit to be 'true' and shut down the mobile terminal; receive a launching instruction input by the user, determine whether or not the emergency contact display flag bit is 'true', control the mobile terminal to enter into an emergency contact display mode to display the contact information stored in the mobile terminal on the screen of the mobile terminal when the emergency contact display flag bit is 'true', sequentially receive a setting instruction input by the user and set the value of the emergency contact display flag bit according to the setting instruction.

Optionally, the emergency contact display module is also configured to receive a page-up instruction input by the user and perform a page-up action on the displayed contact information according to the page-up instruction and receive a page-down instruction input by the user and perform a page-down action on the displayed contact information according to the page-down instruction.

The present disclosure also provides a mobile terminal comprising the above mentioned information backup device.

The present disclosure has the following beneficial effects: an information backup device detects the battery volume of a mobile terminal, and stores the contact information stored in the mobile terminal into a backup memory card when the battery volume of the mobile terminal reduces to a preset low-battery alarming threshold, the user can insert the backup memory card into another terminal to view contact information.

DETAILED DESCRIPTION

The specific embodiments of the present disclosure will be described in conjunction with the accompanying drawings.

To enable a user to view contact information on a mobile terminal running out of power, the communication module of the mobile terminal may be closed or the brightness of the screen of the mobile terminal may be reduced automatically, or power-hungry applications may be closed to reduce the power consumption of the mobile terminal and prolong the standby time of the mobile terminal to make time for the user to view contact information, or information of some important contacts are automatically copied into a Subscriber Identity Module (SIM) card when the power of the mobile terminal is low so that the user can view related contacts by inserting his/her own SIM card into another terminal.

However, since a mobile terminal cannot be powered by itself and the power consumption of existing intelligent mobile terminal rises increasingly while battery duration is far from sufficient, the first means of closing a communication module or reducing the brightness of a screen cannot support the mobile terminal to stand by for a long time, and hardware will be forcedly shut down once the battery is exhausted and the voltage falls below a critical value; meanwhile, the second means of copying important contact information into an SIM card also has the following significant defects: since the storage capacity of an ordinary SIM card is at most two or three hundred of pieces of contact information and most users store contacts in the FLASH of a mobile terminal only if the storage space of an SIM card is fully used, the SIM card cannot provide a spare space for the storage of the contacts stored in the FLASH, moreover, an emergency requirement of the user cannot be met if only important contacts are stored, especially when the user has a higher and higher requirement on the storage capacity of the mobile terminal today, the second means has no practical significance.

The present disclosure provides a method, a system and a mobile device for information backup, to enable the user of a mobile terminal to view contact information when the mobile terminal is running out of power.

Figure 1:
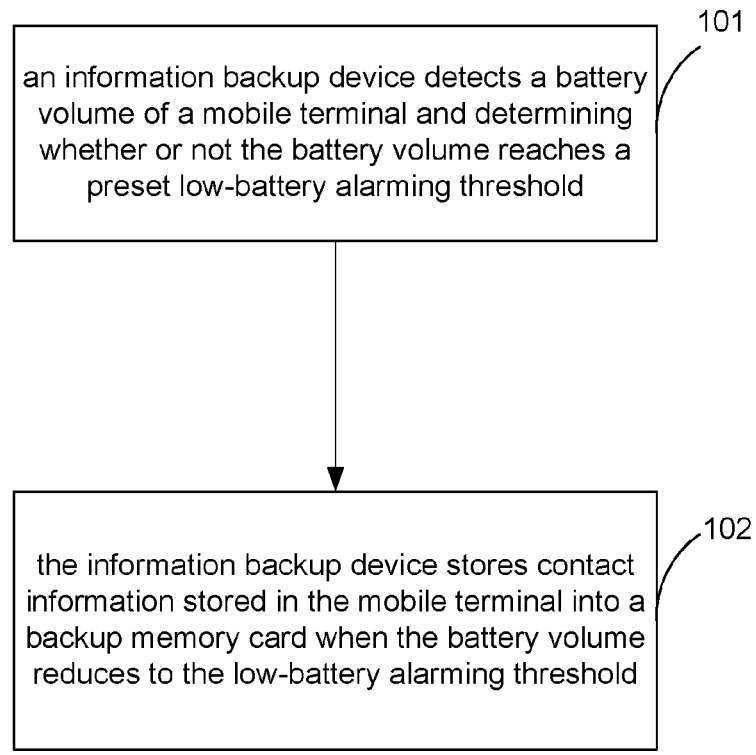
FIG. 1 is a flowchart illustrating the flow of the information backup method disclosed herein.

FIG. 1 is a flowchart illustrating the flow of the information backup method disclosed herein, and as shown in FIG. 1, the method includes the following steps:

Step 101: an information backup device detects the battery volume of a mobile terminal and determines whether or not the battery volume reaches a preset low-battery alarming threshold;

Step 102: the information backup device stores the contact information stored in the mobile terminal into a backup memory card when the battery volume reduces to the low-battery alarming threshold.

The backup memory card is a pluggable memory card readable to another terminal.

In the method, before Step 101, the information backup device sets the low-battery alarming threshold and an emergency contact display threshold according to the input of the user.

Optionally, after Step 102, the method further includes:

the information backup device detects the battery volume of the mobile terminal and determines whether or not the battery volume reaches the preset emergency contact display threshold which is smaller than the low-battery alarming threshold;

the information backup device shuts down the mobile terminal when the battery volume reduces to the emergency contact display threshold; and the information backup device controls the mobile terminal to enter into an emergency contact display mode to display contact information on the screen of the mobile terminal after a launching instruction input by the user is received, wherein the mobile terminal consumes less power when in the emergency contact display mode than when running normally.

By automatically copying all the contact information stored in the FLASH of a mobile terminal to a backup memory card when the battery volume of the mobile terminal reduces to a low-battery alarming threshold while continuing to monitor the battery volume of the mobile terminal and shutting down the mobile terminal when the battery volume of the mobile terminal reduces an emergency contact display threshold, the information backup method provided herein can supply power for an emergency display when the user needs to view the contact information stored in the FLASH of the mobile terminal, thereby avoiding the problem that the user cannot view the contact information stored in the FLASH of the mobile terminal when the mobile terminal runs out of power.

Figure 2:
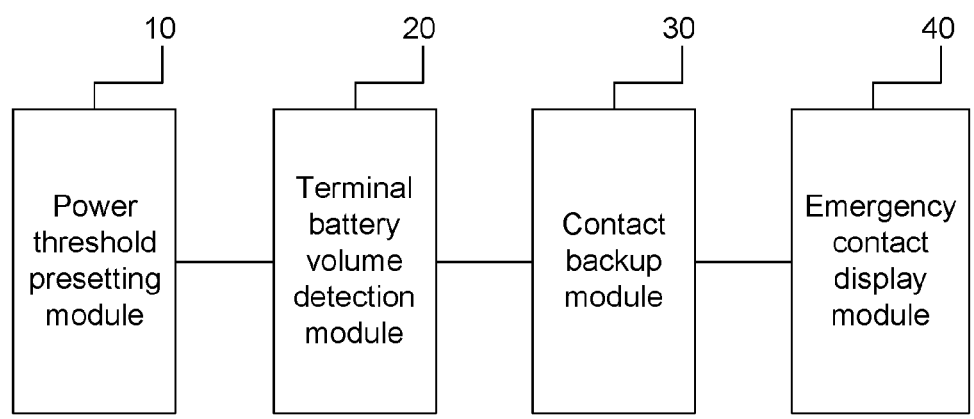
FIG. 2 is a structural block diagram of the information backup device disclosed herein.

FIG. 2 is a structural block diagram of the information backup device disclosed herein, and as shown in FIG. 2, the device includes:

a terminal battery volume detection module 20 configured to detect the battery volume of a mobile terminal and determine whether or not the battery volume reaches a preset a low-battery alarming threshold; and a contact backup module 30 configured to store the contact information stored in the mobile terminal into a backup memory card when the battery volume reduces to the low-battery alarming threshold.

The backup memory card is a pluggable memory card readable to another terminal.

Optionally, the terminal battery volume detection module 20 is also configured to detect the battery volume of the mobile terminal and determine whether or not the battery volume reaches a preset emergency contact display threshold which is smaller than the low-battery alarming threshold; and Optionally, the information backup device also includes:

an emergency contact display module 40 configured to shut down the mobile terminal when the battery volume reduces to the emergency contact display threshold and control the mobile terminal to enter into an emergency contact display mode to display contact information on the screen of the mobile terminal after receiving a launching instruction input by the user, wherein the mobile terminal consumes less power when in the emergency contact display mode than when running normally.

Optionally, the information backup device also includes:

a power threshold presetting module 10 configured to set the low-battery alarming threshold and the emergency contact display threshold according to the input of the user.

Optionally, the contact backup module 30 is configured to detect whether or not the backup memory card is normally inserted into the mobile terminal when the battery volume reduces to the low-battery alarming threshold, and store the contact information stored in the mobile terminal into the backup memory card when the backup memory card is normally inserted into the mobile terminal and is in a loading state.

Optionally, the emergency contact display module 40 is configured to, when the battery volume reduces to the emergency contact display threshold, set an emergency contact display flag bit to be 'true' and shut down the mobile terminal, receive a launching instruction input by the user, determine whether or not the emergency contact display flag bit is 'true', control the mobile terminal to enter into the emergency contact display mode to display the contact information stored in the mobile terminal on the screen of the mobile terminal when the emergency contact display flag bit is 'true', sequentially receive a setting instruction input by the user and set the value of the emergency contact display flag bit according to the setting instruction.

The emergency contact display module 40 is also configured to receive a page-up instruction input by the user and perform a page-up action on the displayed contact information according to the page-up instruction, or receive a page-down instruction input by the user and perform a page-down action on the displayed contact information according to the page-down instruction.

By automatically copying all the contact information stored in the FLASH of a mobile terminal to a backup memory card when the battery volume of the mobile terminal reduces to a low-battery alarming threshold while continuing to monitor the battery volume of the mobile terminal and shutting down the mobile terminal when the battery volume of the mobile terminal reduces an emergency contact display threshold, the information backup device provided herein can supply power for an emergency display when the user needs to view the contact information stored in the FLASH of the mobile terminal, thereby avoiding the problem that the user cannot view the contact information stored in the FLASH of the mobile terminal when the mobile terminal runs out of power.

The present disclosure also provides a mobile terminal comprising the foregoing information backup device.

The information backup method disclosed herein is described below in detail with reference to accompanying drawings when read in conjunction with specific embodiments.

Embodiment 1

Figure 3:
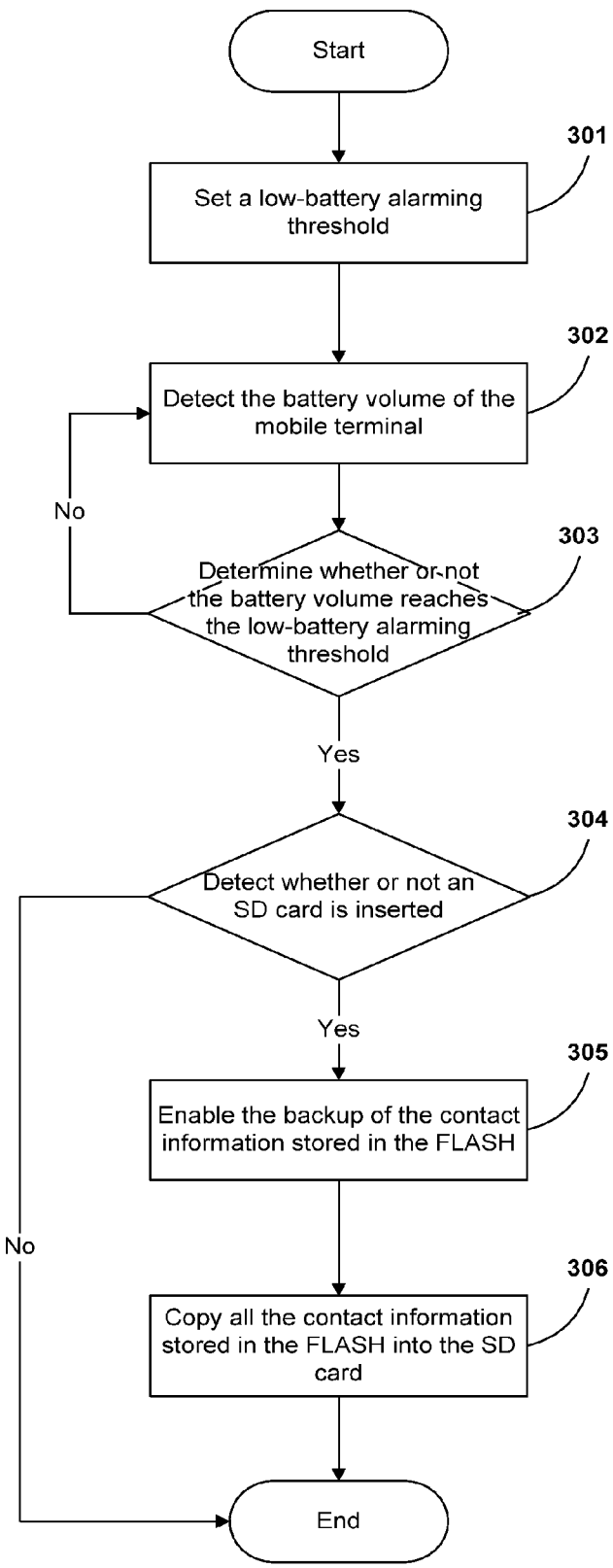
FIG. 3 is a flowchart illustrating the flow of an information backup method according to embodiment 1 of the present disclosure.

The technical solution provided in the embodiment realizes the backup of the contact information stored in the FLASH of a mobile terminal, and as shown in FIG. 3, the following steps are included in the embodiment:

Step 301: the setting of a low-battery alarming threshold is completed in a power threshold presetting module in an information backup device, specifically, a drop-down checkbox for setting a low-battery alarming threshold is provided in the power threshold presetting module to provide a plurality of parameters, for example, three power thresholds of residual power: 15%, residual power: 10% and residual power: 5%, for the user to select flexibly, the user can select one of the power thresholds as a low-battery alarming threshold so that the user can flexibly select a low-battery alarming moment according to his/her own habit and the current environment.

Step 302: the battery volume of the mobile terminal is detected;

Specifically, the battery volume of the mobile terminal can be acquired by existing battery volume acquisition interface equipped in the mobile terminal.

Step 303: whether or not the battery volume of the mobile terminal reaches a low-battery alarming threshold is determined, the low-battery alarming threshold refers here to the residual power value selected by the user in Step 301, for example, if the user selects residual power 15% as the low-battery alarming threshold, then whether or not the current battery volume of the mobile terminal is smaller than the low-battery alarming threshold is determined, a low-battery alarming prompt box is propped up when the battery volume of the mobile terminal is reduced to the low-battery alarming threshold to inform the user of the enablement of a contact backup flow; and Step 302 is executed to detect the battery volume of the mobile terminal when the battery volume of the mobile terminal is not reduced to the low-battery alarming threshold.

Step 304: whether or not a backup memory card is inserted into the mobile terminal is determined, wherein the backup memory card is a pluggable memory card readable to another terminal. Specifically, the backup memory card may be a Secure Digital Memory Card (SD), if the SD card is normally inserted into the mobile terminal and is in a loading state, Step 305 is executed otherwise, the contact backup flow is skipped and the flow is ended.

Step 305: the information backup device starts a contact backup flow, wherein contact refers to all the contact information stored in the FLASH of the mobile terminal; the contact backup flow is called as an independent flow and runs in the background, and the whole launching process causes no interference to the current operation of the user on the mobile terminal.

Step 306: the information backup device copies all the contact information stored in the FLASH into the SD card, the contact backup refers to the storage of all the contact information stored in the FLASH of the mobile terminal in a specific directory of the SD card in a plaintext form, the adoption of the plaintext form enables the stored contact information to be opened, no matter the contact information is stored in an ordinary mobile terminal or a personal computer, using the text editing tool provided in the ordinary mobile terminal or the personal computer without using a specific piece of software, thus facilitating the emergency contact data view of the user.

In the embodiment, an information backup device detects the battery volume of a mobile terminal and stores the contact information stored in the mobile terminal into a backup memory card when the battery volume of the mobile terminal reduces to a preset low-battery alarming threshold, the user can insert the backup memory card into another terminal to view contact information.

Embodiment 2

Figure 4:
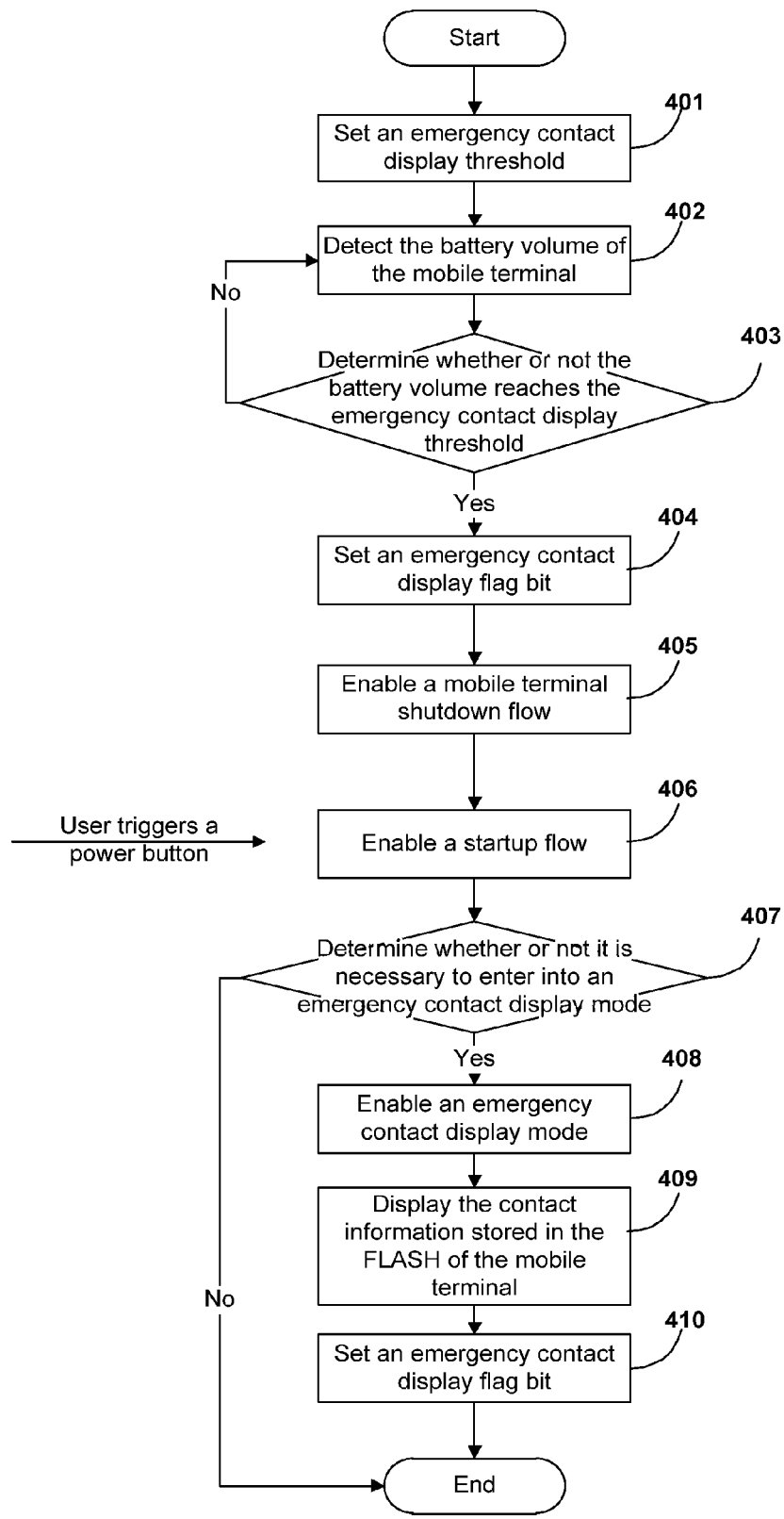
FIG. 4 is a flowchart illustrating the flow of an information backup method according to embodiment 2 of the present disclosure.

The technical solution provided in the embodiment realizes the display of contact information on the screen of a mobile terminal after the mobile terminal running out of power is shut down, and as shown in FIG. 4, the following steps are included in the embodiment:

Step 401: the setting of an emergency contact display threshold is completed in a power threshold presetting module in an information backup device, specifically, a drop-down checkbox for setting an emergency contact display threshold is provided in the power threshold presetting module to provide a plurality of parameters, for example, three power thresholds of residual power 15%, residual power 10% and residual power 5%, for the user to select flexibly, the user can select one of the power thresholds as the emergency contact display threshold so that the user can flexibly select an emergency contact display threshold moment according to his/her own habit and the current environment.

Step 402: the battery volume of the mobile terminal is detected;

Specifically, the battery volume of the mobile terminal can be acquired by existing battery volume acquisition interface provided in the mobile terminal.

Step 403: whether or not the battery volume of the mobile terminal reaches the emergency contact display threshold is determined, the emergency contact display threshold refers here to the value of the residual power selected by the user in Step 401, for example, if the user selects residual power 10% as the emergency contact display threshold, then whether or not the current battery volume of the mobile terminal is smaller than the emergency contact display threshold is determined, a prompt box indicating 'automatic shutdown for low battery' is propped up when the battery volume of the mobile terminal is reduced to the emergency contact display threshold to inform the user of the starting of an automatic shutdown flow, and Step 402 is executed to detect the battery volume of the mobile terminal if the battery volume of the mobile terminal is not smaller than the emergency contact display threshold.

Step 404: an emergency contact display flag bit is set, specifically, when the information backup device detects that the battery volume of the mobile terminal is reduced to the emergency contact display threshold, the mobile terminal is automatically shut down to reserve power for an emergency display of contacts later, however, the emergency contact display flag bit must be set before the shutdown so that a flag is provided when a power button is pressed after mobile terminal is shut down for the information backup device to enter into an emergency contact display mode according to the flag but not to implement a normal startup flow.

Step 405: the automatic shutdown flow of the mobile terminal is enabled to shut down the mobile terminal;

Step 406: a launching instruction input by the user is received so that the user can press the power button to start a startup flow to view the contact information stored in the FLASH of the mobile terminal when the mobile terminal is automatically shut down for low battery;

Step 407: the information backup device determines whether or not to enter an emergency contact display mode, here, the condition for the determination on whether or not to enter the emergency contact display mode is the emergency contact display flag bit set in Step 404, if the emergency contact display flag bit is 'true', then the emergency contact display mode is started, otherwise, the normal startup flow is continued.

Step 408: the information backup device enables the emergency contact display mode, an action of loading the contact information stored in the FLASH of the mobile terminal into an internal memory is mainly completed in this step and a cycle of monitoring a side volume button is established in this step so that the contact information is paged up or paged down when the volume-up or a volume-down event of the side volume button is received.

Step 409: the information backup device displays the contact information stored in FLASH of the mobile terminal on the screen of the mobile terminal, after the loading of the contact information into the internal memory is completed in Act 408, the information backup device darkens the screen of the mobile terminal in the emergency contact display mode and closes a series of hardware modules not involved in display so as to realize an optimal power-saving state and then displays the contact information on the screen of the mobile terminal in a list form. Meanwhile, a page-up action or a page-down action is performed in response to a side volume button event, for example, a page-up action is performed on the displayed contact information after a page-up instruction is received which is input by the user through the side volume button, or a page-down action is performed on the displayed contact information after a page-down instruction is received which is input by the user through the side volume button.

Step 410: an emergency contact display flag bit is set so that the user can confirm whether or not to enter the emergency contact display mode again after viewing the contact information stored in the FLASH, if the user determines to enter the emergency contact display mode again, the current value of the emergency contact display flag bit is kept, otherwise, the emergency contact display flag bit is set to be false; the mobile terminal is shut down after the setting of the emergency contact display flag bit is completed.

In the embodiment, when the battery volume of a mobile terminal reduces to an emergency contact display threshold, the mobile terminal is automatically shut down to save power for an emergency display of the contact information stored in the FLASH of the mobile terminal later, thus avoiding the problem that the contact information stored in the FLASH of the mobile terminal cannot be viewed after the mobile terminal runs out of power.

Embodiment 3

Figure 5:
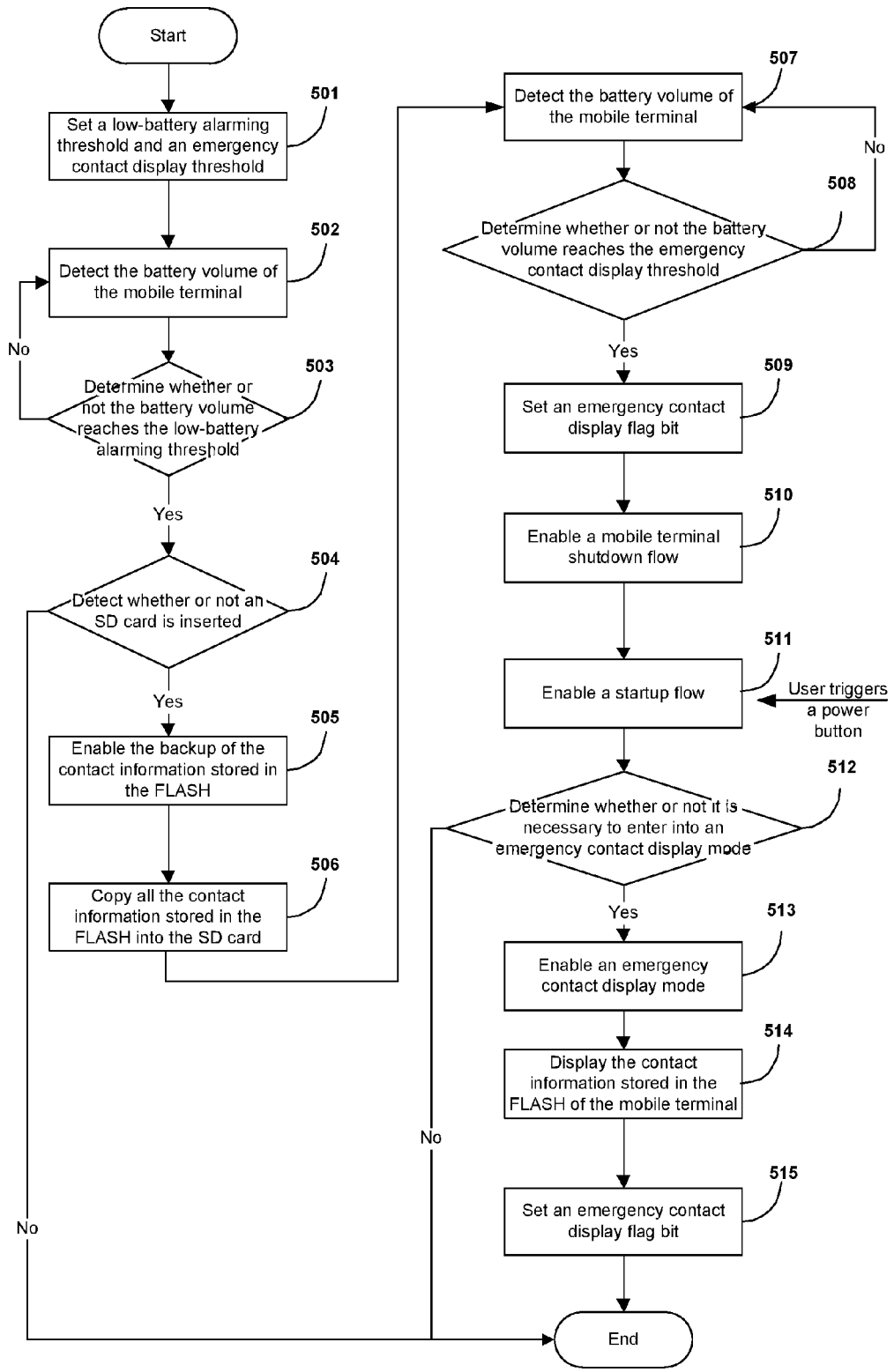
FIG. 5 is a flowchart illustrating the flow of an information backup method according to embodiment 3 of the present disclosure.

The technical solution provided in this embodiment realizes the backup of the contact information stored in the FLASH of a mobile terminal and the display of the contact information on the screen of the mobile terminal after the mobile terminal is shut down for low battery, and as shown in FIG. 5, the following steps are included in the embodiment:

Step 501: the setting of a low-battery alarming threshold and an emergency contact display threshold is completed in a power threshold presetting module provided in an information backup device, specifically, a drop-down checkbox for setting the low-battery alarming threshold and the emergency contact display threshold is provided in the power threshold presetting module to provide a plurality of parameters, for example, three power thresholds of residual power 15%, residual power 10% and residual power 5%, for the user to select flexibly, the user can select one of the three thresholds as the low-battery alarming threshold and the emergency contact display threshold so that the user can flexibly select a low-battery alarming moment according to his/her own habit and the current environment, wherein the emergency contact display threshold should be lower than the low-battery alarming threshold.

Step 502: the battery volume of the mobile terminal is detected;

Specifically, the battery volume of the mobile terminal can be acquired by existing battery volume acquisition interface provided in the mobile terminal.

Step 503: whether or not the battery volume of the mobile terminal reaches a low-battery alarming threshold is determined, the low-battery alarming threshold refers here to the residual power value selected by the user in Step 501, for example, if the user selects residual power 15% as the low-battery alarming threshold, then whether or not the current battery volume of the mobile terminal is smaller than the low-battery alarming threshold is determined, a low-battery alarming prompt box is propped up when the battery volume of the mobile terminal is reduced to the low-battery alarming threshold to inform the user of the starting of a contact backup flow; and Step 501 is executed to detect the battery volume of the mobile terminal if the battery volume of the mobile terminal is not reduced to the low-battery alarming threshold.

Step 504: whether or not a backup memory card is inserted into the mobile terminal is determined, wherein the backup memory card is a pluggable memory card readable to another terminal. Specifically, the backup memory card may be a Secure Digital Memory Card (SD), if the SD card is normally inserted into the mobile terminal and is in a loading state, Step 505 is executed, otherwise, the contact backup flow is skipped and Step 502 is executed to continue to detect the battery volume of the mobile terminal.

Step 505: the information backup device enables a contact backup flow, wherein contact refers to all the contact information stored in the FLASH of the mobile terminal, the contact backup flow is called as an independent flow and runs in the background, and the whole launching process causes no interference to the current operation of the user on the mobile terminal.

Step 506: the information backup device copies all the contact information stored in the FLASH into the SD card, the contact backup refers to the storage of all the contact information stored in the FLASH of the mobile terminal in a specific directory of the SD card in a plaintext form, the adoption of the plaintext form enables the contact information to be opened, no matter the contact information is stored in an ordinary mobile terminal or a personal computer, using the text editing tool provided in the ordinary mobile terminal or the personal computer without using a specific piece of software, thus facilitating the emergency contact data view of the user.

Step 507: the battery volume of the mobile terminal is detected.

Specifically, the battery volume of the mobile terminal can be acquired by existing battery volume acquisition interface provided in the mobile terminal.

Step 508: whether or not the battery volume of the mobile terminal reaches the emergency contact display threshold is determined, the emergency contact display threshold refers here to the residual power value selected by the user in Step 501, for example, if the user selects residual power 10% as the emergency contact display threshold, then whether or not the current battery volume of the mobile terminal is smaller than the emergency contact display threshold is determined, a prompt box indicating 'automatic shutdown for low battery' is propped up when the battery volume of the mobile terminal is reduced to the emergency contact display threshold to inform the user of the starting of an automatic shutdown flow, and Step 507 is executed to continue to detect the battery volume of the mobile terminal if the battery volume of the mobile terminal is not reduced to the emergency contact display threshold.

Step 509: an emergency contact display flag bit is set, specifically, when the information backup device detects that the battery volume of the mobile terminal is reduced to the emergency contact display threshold, the mobile terminal is automatically shut down to reserve power for an emergency display of contacts later, however, the emergency contact display flag bit must be set before the shutdown so that the flag is provided when a power button is pressed after the mobile terminal is shut down for the information backup device to enter into an emergency contact display mode according to the flag but not to implement a normal startup flow.

Step 510: the shutdown flow of the mobile terminal is enabled to shut down the mobile terminal.

Step 511: a launching instruction input by the user is received so that the user can press the power button to start a startup flow to view the contact information stored in the FLASH of the mobile terminal when the mobile terminal is automatically shut down for low battery.

Step 512: the information backup device determines whether or not to enter an emergency contact display mode, here, the condition for the determination on whether or not to enter the emergency contact display mode is the emergency contact display flag bit set in Step 509, if the emergency contact display flag bit is 'true', then the emergency contact display mode is started, otherwise, the normal startup flow is continued.

Step 513: the information backup device starts the emergency contact display mode, an action of loading the contact information stored in the FLASH of the mobile terminal into an internal memory is mainly completed in this step and a cycle of monitoring a side volume button is established in this step so that the contact information is paged up or paged down when the volume-up or a volume-down event of the side volume button is received.

Step 514: the information backup device displays the contact information stored in FLASH of the mobile terminal on the screen of the mobile terminal, after the loading of contact information into the internal memory is completed in Step 513, the information backup device darkens the screen of the mobile terminal in the emergency contact display mode and closes a series of hardware modules not involved in display so as to realize an optimal power-saving state and then display the contact information on the screen of the mobile terminal in a list form. Meanwhile, a page-up action or a page-down action is performed in response to a side volume button event, for example, a page-up action is performed on the displayed contact information after a page-up instruction input by the user through a side volume button is received, or a page-down action is performed on the displayed contact information after a page-down instruction input by the user through a side volume button is received.

Step 515: an emergency contact display flag bit is set so that the user can confirm whether or not to enter the emergency contact display mode again after viewing the contact information stored in the FLASH, if the user determines to enter the emergency contact display mode again, the current value of the emergency contact display flag bit is kept, otherwise, the emergency contact display flag bit is set to be false; the mobile terminal is shut down after the setting of the emergency contact display flag bit is completed.

Two approaches are provided in the present disclosure for the user to acquire the contact information stored in the FLASH of a mobile terminal after the mobile terminal is shut down for low battery, in one of the two approaches, contact information is copied into an SD card and then read by another terminal, and if there is no another terminal available, the mobile terminal can be started by preserved emergency power to enter into an emergency contact display mode for the user to acquire contact information, the emergency contact display mode is more power-saving than a normal startup mode, thus, the utilization rate of a battery is maximized, moreover, a page-up action is performed on the contact information through a side volume button, which provides convenience for the user and skillfully multiplexes existing hardware and consequentially avoids the loss caused as the user cannot view contact information and greatly improves user experience.

A great many of functional components described herein are referred to as modules in order to more particularly emphasize their implementation independence.

In the present disclosure, modules can be implemented as software to be executed by various types of processors. For example, an identified executable code module may include one or more physical or logic blocks of computer instructions which may be constructed as, for example, an object, a procedure, or a function. Nevertheless, the identified executable code module can be stored at different positions as different instructions but are not physically integrated, and when logically combined, the instructions constitute a module and achieve the specific purpose of the module.

Actually, an executable code module may be a single instruction or a plurality of instructions or even distributed in a plurality of different code segments or distributed in different programs or distributed across a plurality of memory devices. Similarly, operational data may be recognized in the module, realized in any suitable form and organized in any suitable type of data structure. The operation data may be collected as a single data set or distributed at different positions (included in different storage devices) and is at least partially present on a system or network only as electronic signals.

If a module can be implemented as software, taking into consideration the level of existing hardware technology and regardless of cost, corresponding hardware circuits can be constructed for the module implemented as software to achieve corresponding functions, the hardware circuits including the ordinary Very Large Scale Integration (VLSI) circuit or a gate array or an existing semiconductor component such as a logic chip or a transistor or other discrete components. A module may also be achieved using a programmable hardware device, such as a field programmable gate array, programmable array logic or a programmable logic device.

In each embodiment of the method disclosed herein, the serial numbers of the steps cannot be used to define the execution sequence of the steps, for those of ordinary skill in the art, and the modification on the execution sequence of the steps without making any creative effort should fall within the protection scope of the present disclosure.

The above mentioned is only preferred embodiments, and it should be appreciated that various modification and variations can be devised by those skilled in the art without departing from the scope of the present disclosure, and such modification and variations should fall within the protection scope of the present disclosure.

The invention claimed is:

1. A method for information backup, including that:
   detecting, by an information backup device, a battery volume of a mobile terminal and determining whether or not the battery volume reaches a preset low-battery alarming threshold; and
   storing, by the information backup device, contact information stored in the mobile terminal into a backup memory card when the battery volume reduces to the low-battery alarming threshold;

detecting, by the information backup device, the battery volume of the mobile terminal and determining whether or not the battery volume reaches a preset emergency contact display threshold which is smaller than the low-battery alarming threshold;

shutting down, by the information backup device, the mobile terminal when the battery volume reduces to the emergency contact display threshold; and controlling, by the information backup device, the mobile terminal to enter into an emergency contact display mode to display contact information on the screen of the mobile terminal after receiving a launching instruction input by a user, wherein the mobile terminal consumes less power when in the emergency contact display mode than when running normally;

wherein after the step of controlling, by the information backup device, the mobile terminal to enter into an emergency contact display mode to display contact information on the screen of the mobile terminal after a launching instruction input by a user is received, the method further comprises:

receiving, by the information backup device, a page-up instruction input by the user and performing a page-up action on the displayed contact information according to the page-up instruction; or receiving, by the information backup device, a page-down instruction input by the user and performing a page-down action on the displayed contact information according to the page-down instruction.

2. The method according to claim 1, wherein before the step of detecting, by an information backup device, a battery volume of a mobile terminal and determining whether or not the battery volume reaches a preset low-battery alarming threshold, the method further includes:

setting, by the information backup device, the low-battery alarming threshold and the emergency contact display threshold according to the input of the user.

3. The method according to claim 1, wherein the step of storing, by the information backup device, contact information stored in the mobile terminal into a backup memory card comprises:

detecting, by the information backup device, whether or not the backup memory card is normally inserted into the mobile terminal and storing the contact information stored in the mobile terminal into the backup memory card when the backup memory card is normally inserted into the mobile terminal and is in a loading state.

4. The method according to claim 1, wherein the step of shutting down, by the information backup device, the mobile terminal comprises: setting, by the backup display device, an emergency contact display flag bit to be 'true' and then shutting down the mobile terminal;

the step of controlling, by the information backup device, the mobile terminal to enter into an emergency contact display mode to display contact information on the screen of the mobile terminal after a launching instruction input by a user is received comprises: receiving, by the backup display device, the launching instruction input by the user, determining whether or not the emergency contact display flag bit is 'true', and controlling the mobile terminal to enter into the emergency contact display mode to display the contact information stored in the mobile terminal on the screen of the mobile terminal when the emergency contact display flag bit is 'true';

after the step of controlling, by the information backup device, the mobile terminal to enter into an emergency contact display mode to display contact information on the screen of the mobile terminal after a launching instruction input by a user is received, the method further comprises: receiving, by the backup display device, a setting instruction input by the user and setting the value of the emergency contact display flag bit according to the setting instruction.

5. A device for information backup, comprising: a terminal battery volume detection module and a contact backup module, wherein the terminal battery volume detection module is configured to detect a battery volume of a mobile terminal and determine whether or not the battery volume reaches a preset low-battery alarming threshold; and the contact backup module is configured to store contact information stored in the mobile terminal into a backup memory card when the battery volume reduces to the low-battery alarming threshold;

wherein the terminal battery volume detection module is also configured to detect the battery volume of the mobile terminal and determine whether or not the battery volume reaches a preset emergency contact display threshold which is smaller than the low-battery alarming threshold; and the information backup device further comprises an emergency contact display module configured to: shut down the mobile terminal when the battery volume reduces to the emergency contact display threshold; control the mobile terminal to enter into an emergency contact display mode to display contact information on the screen of the mobile terminal after a launching instruction input by the user is received, wherein the mobile terminal consumes less power when in the emergency contact display mode than when running normally; and wherein the emergency contact display module is also configured to receive a page-up instruction input by the user and perform a page-up action on the displayed contact information according to the page-up instruction, or receive a page-down instruction input by the user and perform a page-down action on the displayed contact information according to the page-down instruction.

6. The device according to claim 5, further comprising:

a power threshold presetting module configured to set the low-battery alarming threshold and the emergency contact display threshold according to the input of the user.

7. The device according to claim 5, wherein the contact backup module is configured to detect whether or not the backup memory card is normally inserted into the mobile terminal when the battery volume reduces to the low-battery alarming threshold, and store the contact information stored in the mobile terminal into the backup memory card when the backup memory card is normally inserted into the mobile terminal and is in a loading state.

8. The device according to claim 5, wherein the emergency contact display module is configured to, when the battery volume reduces to the emergency contact display threshold, set an emergency contact display flag bit to be 'true' and shut down the mobile terminal; receive a launching instruction input by the user, determine whether or not the emergency contact display flag bit is 'true', control the mobile terminal to enter into an emergency contact display mode to display the contact information stored in the mobile terminal on the screen of the mobile terminal when the emergency contact display flag bit is 'true', sequentially receive a setting instruction input by the user and set the value of the emergency contact display flag bit according to the setting instruction.

9. A mobile terminal comprising the information backup device claimed in claim 5.

10. A mobile terminal comprising the information backup device claimed in claim 6.

11. A mobile terminal comprising the information backup device claimed in claim 7.

12. A mobile terminal comprising the information backup device claimed in claim 8.

* * * * *